Patented Dec. 20, 1938

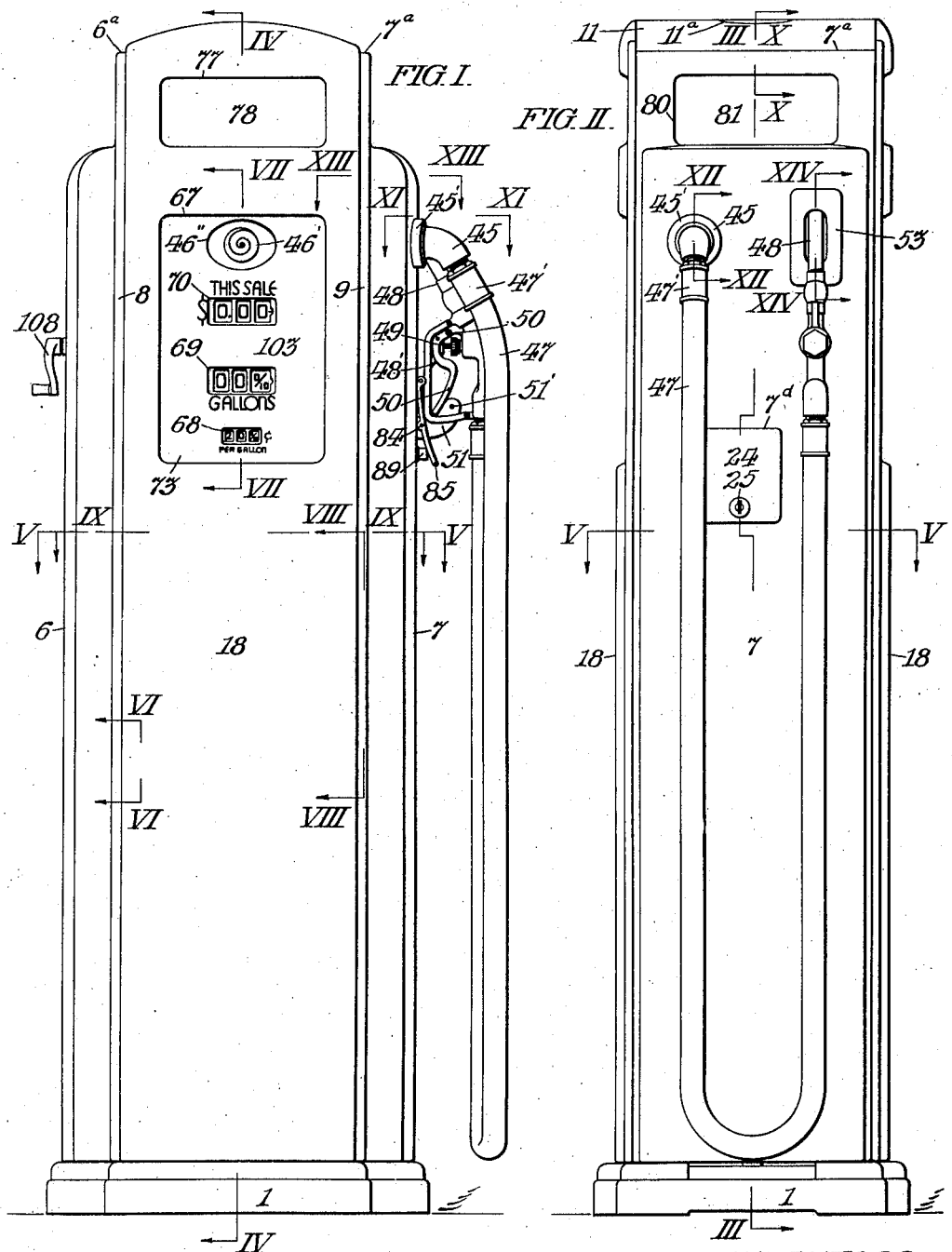

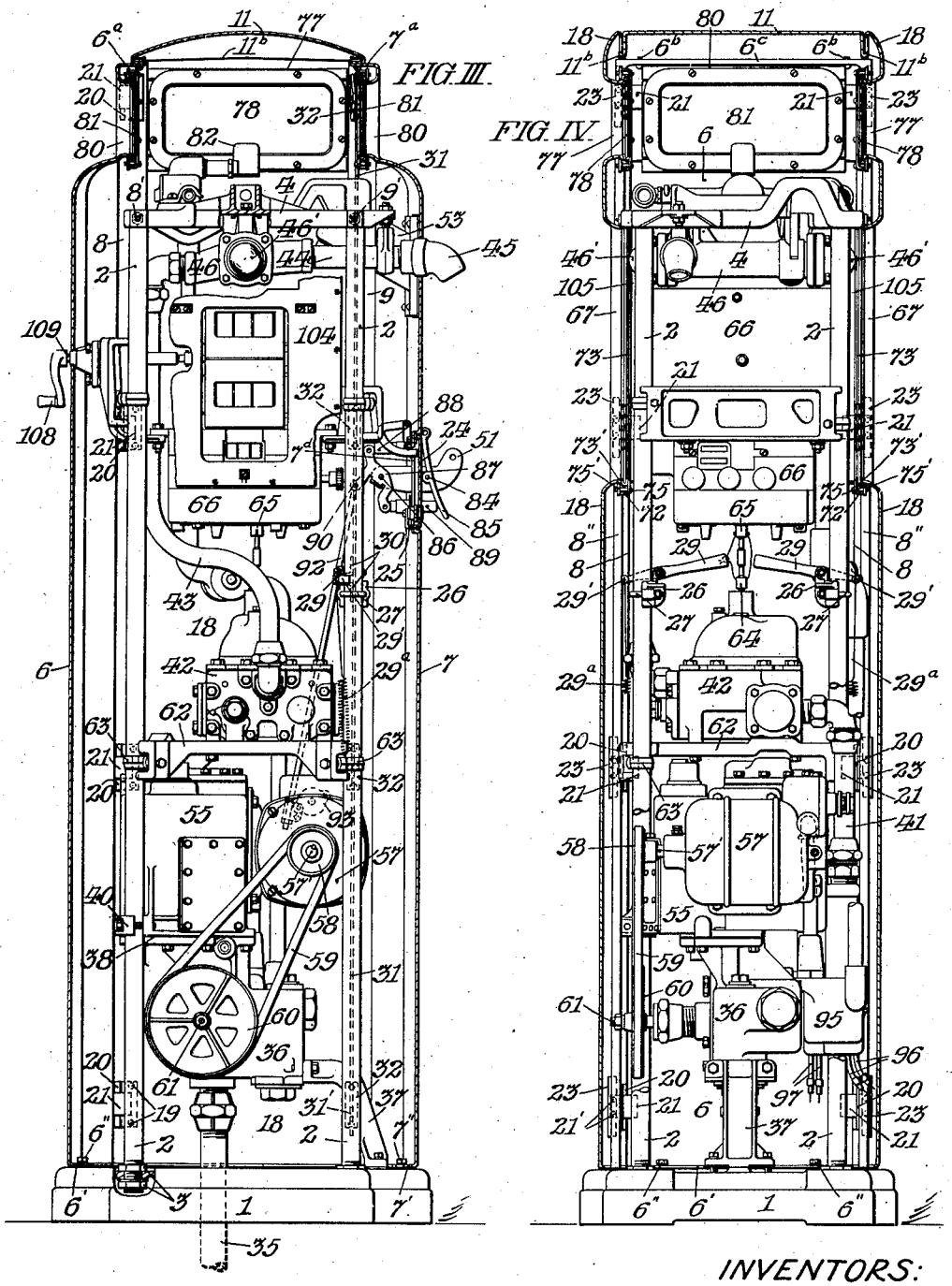

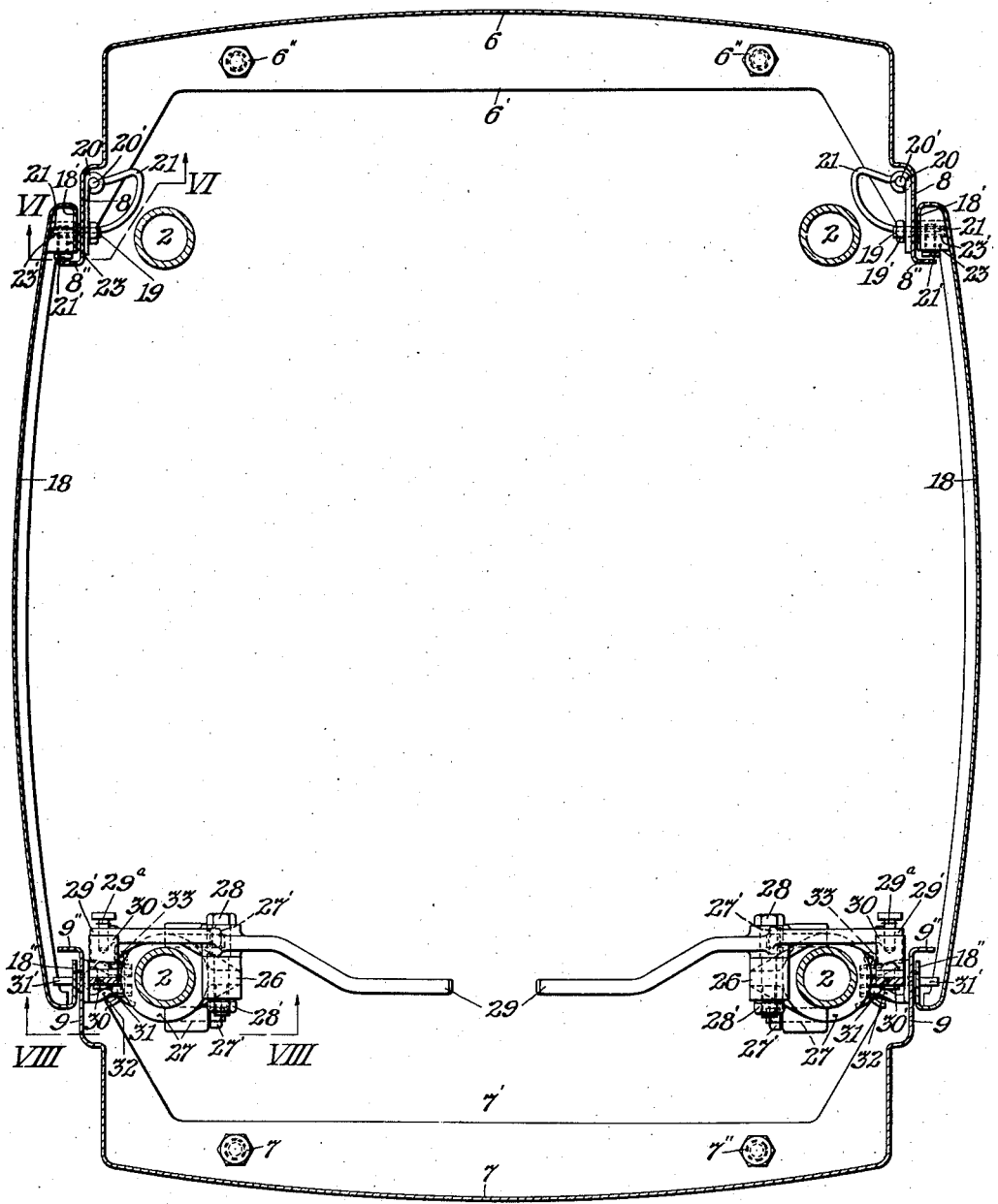

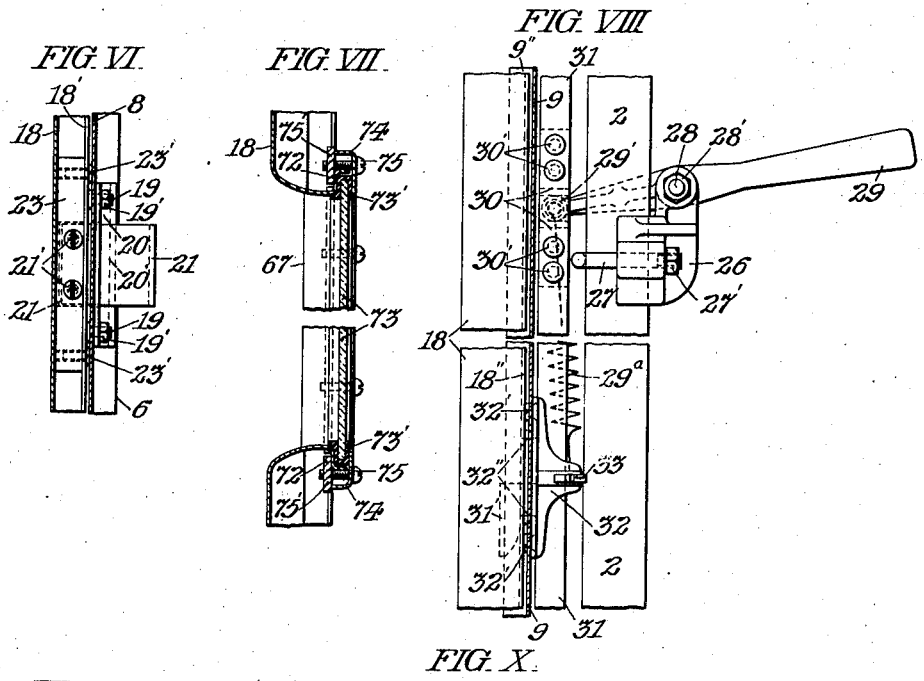

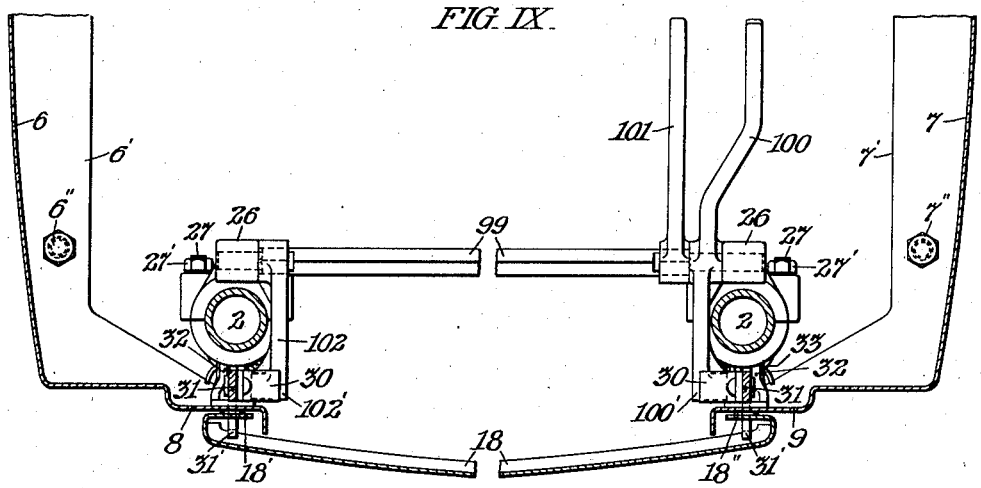
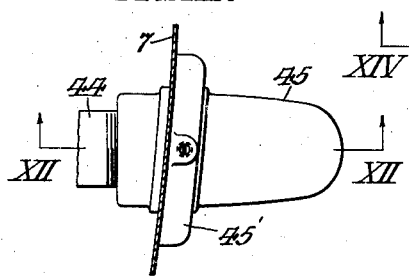
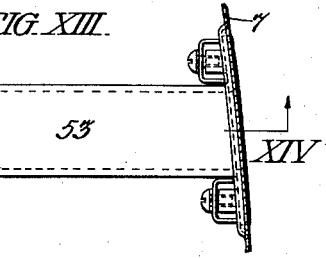
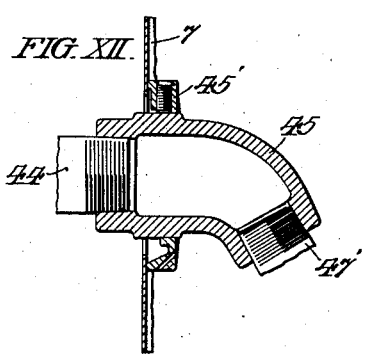
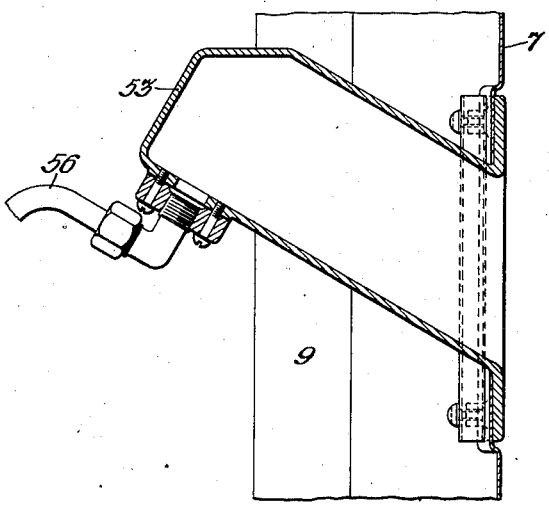

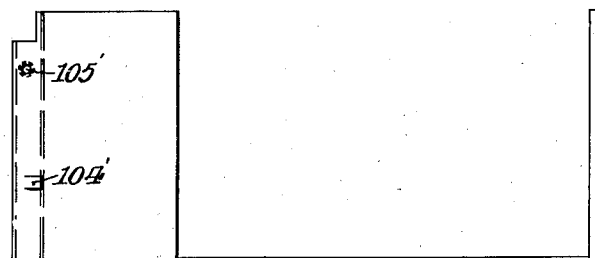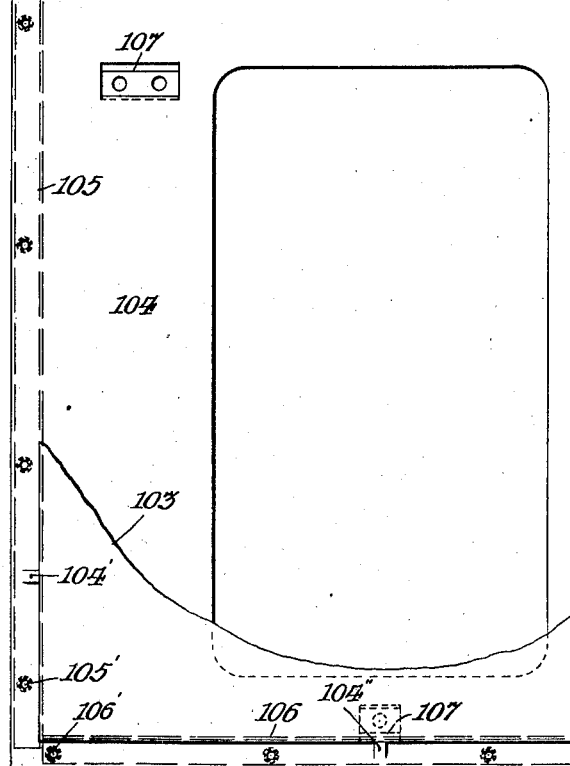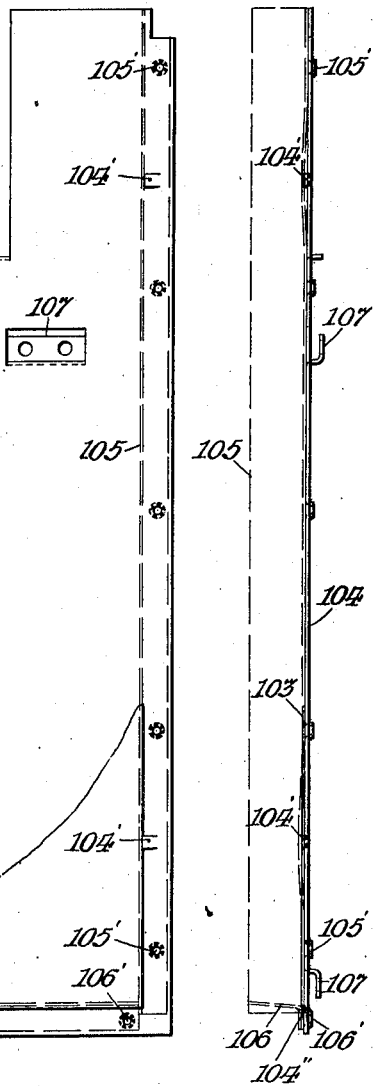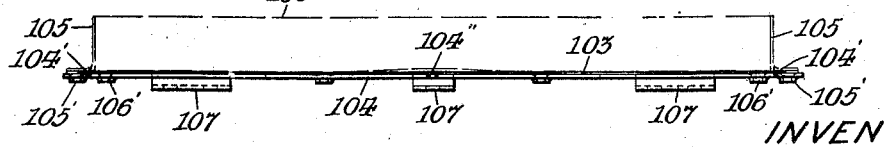

2,141,124

UNITED STATES PATENT OFFICE 2,141,124

HOUSING FOR LIQUID DISPENSING APPARATUS

Eric H. Bradley, Spring Lake, Mich., and William H. D. Brouse, Toronto, Ontario, Canada, assignors to John Wood Manufacturing Company, Inc., Conshohocken, Pa., a corporation of Delaware Application March 11, 1938, Serial No. 195,292

7 Claims. (Cl. 221—95)

Such a housing forms a weather-proof inclosure for a liquid pump, an electric motor for actuating said pump to withdraw the liquid from a subjacent tank and force it through a dispensing hose; a meter for measuring the quantity of liquid dispensed; indicating mechanism operatively connected with said meter for registering in a manner visible from the exterior of the housing the volume of liquid being dispensed; an electric lamp or lamps for illuminating such indicating mechanism; switches for independently controlling said pump and lamp circuits; liquid conduits connecting said tank, pump, meter and hose, and conduits for electric conductors extending from an exterior source of electrical energy to the motor, lamps and switches within said housing.

As ordinarily constructed, such housings are formed of numerous pieces held together by screws and bolts, the heads of which are visible upon the exterior of the housing, and the latter has parts forming unsightly protuberances upon the exterior of the housing. Therefore, it is the purpose and effect of our invention to provide a housing which has a streamlined appearance by reason of the fact that it has no unsightly protuberances upon its exterior and although formed of primarily separate pieces, those pieces are fastened together by means entirely concealed within the housing and only visible or accessible upon opening a door in one wall of the housing, which when closed forms part of the smooth exterior of the housing.

As ordinarily constructed, housings for liquid dispensing apparatus have a translucent glass dome at the top thereof encasing an incandescent electric lamp and the top of the housing has a large opening therein to which said glass dome is fitted. Therefore, if the purchaser of such a housing does not wish the same provided with a glass dome, it is necessary to provide a cover for the unused opening which adds to the unsightly appearance of such a housing. Therefore, one of the features of our improved housing is that the metallic top member thereof has no opening through it for such a glass dome, but is merely provided with a region surrounded by an annular indentation such that the portion of the metal circumscribed by such indentation may be instantly knocked out if the purchaser desires to have the housing provided with a glass dome.

As ordinarily constructed, housings for liquid dispensing apparatus have glazed window openings therein at which are displayed dials of indicating means for indicating the volume of liquid dispensed, etc., and such dials are formed of very thin sheet metal which frequently becomes dented and distorted by accidental blows. Therefore, a feature of our invention is the provision of a reinforcing plate for such a dial upon which the dial is securely supported; so that the dial is not only maintained in undamaged condition, but may be easily removed when it is found necessary or desirable to clean the fronts of the seegages, which project through the dials.

As ordinarily constructed, housings for liquid dispensing apparatus are provided with what is known as a "hook lever", forming one of the above contemplated unsightly projections from the housing; which hook lever serves as a support upon which the liquid dispensing hose is hung in idle position and which is manually movable to open and close the electric switch within the housing by which the electric motor is controlled. Therefore, it is an object and effect of our invention to substitute for such movable hook lever and its electric switching appurtenances a simple, inconspicuous push switch.

Our invention includes the various novel features of construction and arrangement hereinafter more definitely specified.

In said drawings; Fig. I is a front elevation of a housing for liquid dispensing apparatus conveniently embodying our invention.

Fig. II is an elevation of the structure shown in Fig. I as seen from the right hand side of the latter.

Fig. III is a vertical sectional view of a housing and an elevation of its contents as seen from the same direction as Fig. I; section being taken on the line III, III in Fig. II in the direction of the arrows on said line.

Fig. IV is a vertical sectional view of said housing and an elevation of its contents as seen from the same direction as Fig. II; section being taken on the line IV, IV in Fig. I.

Fig. V is a plan sectional view of said housing taken on the line V, V in Figs. I and II and showing the means for locking the front and back hinged panels of said housing in rigid relation with the other portions thereof.

Fig. VI is a fragmentary vertical sectional view of said housing, taken on the line VI, VI in Figs. I and V, showing one hinge structure of Fig. V in elevation.

Fig. VII is a fragmentary vertical sectional view of said housing, taken on the line VII, VII in Fig. I, showing the construction and arrangement of one of the glazed window panels.

Fig. VIII is a fragmentary vertical sectional view of said housing, taken on the line VIII, VIII in Figs. I and V, showing in elevation parts of the locking mechanism indicated in Fig. V.

Fig. IX is a fragmentary plan sectional view of said housing, taken on the line IX, IX in Fig. I, but showing a modified form of mechanism for locking and releasing the movable front and back panels thereof.

Fig. X is a fragmentary vertical sectional view of the top of said housing, taken on the line X, X in Fig. II, but showing an adapter for holding a lamp globe in registry with an opening in the top of said housing, which opening is initially closed, as shown in Fig. II, by a knock-out portion of the top member of the housing.

Fig. XI is a fragmentary plan sectional view of said housing, taken on the line XI, XI in Fig. I, showing the construction and arrangement of the elbow for connecting the rigid liquid conduit within said housing with the flexible dispensing hose which extends exterior to said housing.

Fig. XII is a fragmentary vertical sectional view of said housing, taken on the line XII, XII in Figs. II and XI, showing said hose elbow.

Fig. XIII is a fragmentary plan sectional view of said housing, taken on the line XIII, XIII in Fig. I, showing the metallic boot which extends inward from the side wall of the housing shown in Fig. II, to receive the dispensing end of the nozzle, which is attached to the end of the flexible dispensing hose, when the latter is in idle position.

Fig. XIV is a fragmentary vertical sectional view of said housing, taken on the line XIV, XIV in Figs. II and XIII, showing said nozzle boot.

Figs. XV, XVI and XVII are respectively front elevational, right hand edge, and bottom edge views of one dial reinforcing plate.

Referring to Figs. I to V inclusive; the housing includes the hollow base plate 1, having four corners and conveniently formed of cast metal, to which are rigidly connected four cylindrical tubular vertical standards 2. As indicated in Fig. III; said connection may be conveniently effected by screw threading the lower ends of said standards and providing them with nuts 3. The upper ends of said standards 2 are detachably rigidly connected with the top cross frame member 4, also having four corners and conveniently formed of cast metal.

The two opposite stationary side panels 6 and 7 of sheet metal, shown respectively at opposite sides of Fig. I, extend between opposite pairs of corners of said base plate 1. Said panels have inwardly turned flanges 6' and 7' at the bottom thereof rigidly connected with said base plate 1, by tap bolts 6" and 7", as indicated in Fig. V, said bolts being entirely concealed within said housing. As shown in Fig. III, said flanges 6' and 7' are slightly spaced above the top of said base plate 1 to afford interstices beneath them through which any water of condensation or rain may escape outwardly from said housing over said base plate. As shown in Fig. V, said stationary housing panels 6 and 7 have inwardly projecting flanges 8 and 9 which are rigidly connected, by tap bolts 8' and 9' to said top cross frame member 4, as indicated in Fig. III.

As shown in Fig. V, said flanges 8 and 9 respectively on said stationary panels 6 and 7, have at their innermost edges baffle flanges 8" and 9" to outwardly deflect rain upon the exterior of said housing.

As indicated in Fig. X, the upper ends of said stationary panels 6 and 7, which are offset inwardly, as indicated in Fig. I, have inwardly extending flanges 6ª and 7ª, rigidly connected with opposite edges of the top dome plate 11 which is conveniently formed of pressed sheet metal and has inwardly turned flanges 11' opposed to said flanges 6ª and 7ª which are detachably rigidly connected therewith by the screws 6ᵇ and 7ᵇ, shown in Fig. X; said screws being in threaded connection with clamp bars 11" above the flanges 11' on said dome plate; such connecting means being entirely concealed within the housing. As shown in Fig. X, said flanges 6ª and 7ª have at their inner edges baffle flanges 6ᶜ and 7ᶜ to outwardly deflect rain falling upon the exterior of said housing.

As shown in Figs. IV and X; said dome plate 11 has inclined gutters 11ᵇ for discharging rain outside said flanges 8" and 9", of panels 6 and 7.

As indicated in Fig. II, said top dome plate 11 is normally imperforate at its central portion, but is provided with an annular indentation, of the diameter indicated at 11ª, 11ª in Fig. X, such that the portion of the metal circumscribed by such indentation may be instantly knocked out, leaving an opening as indicated in Fig. X, which opening is circular and adapted to receive the annular globe holder 12 for supporting the globe 13 which conveniently rests upon radial ribs 12' in said holder. As indicated in Fig. X, said holder 12 is also provided with drain openings 12" to permit the escape of rain or other moisture from said holder. Said holder 12 is secured in rigid relation with said top dome member 11 conveniently by the clamp ring 15, the perimeter of which resiliently engages the undersurface of said top dome member 11 when said clamp ring is secured to said holder by the screws 15' as shown in Fig. X. The tubular neck 13' of said globe 13 has an inclined bead 13" for engagement by a circular series of set screws 16 in threaded engagement with said holder.

Referring to Figs. I, II, IV, and V; said housing includes two movable panels 18, which are oppositely counterpart and respectively positioned at the opposite sides of said housing between said stationary panels 6 and 7, as best shown in Figs. V. As shown in that figure; the opposite vertical edges of said panels are turned inwardly to form flanges 18' and 18" respectively positioned parallel with the flanges 8 on the stationary panel 6 and the flanges 9 on the stationary panel 7 when said movable panels 18 are in the closed position shown in Fig. V. As shown in Figs. V and VI; the flanges 8 of the stationary panel 6 have rigidly connected therewith, by bolts 19 and nuts 19', stationary hinge leaves 20 and holding pintles 20', upon which the movable hinge leaves 21 are pivoted. As shown in Figs. V and VI; the heads of said bolts 19 extend between the flanges 8 on the stationary panel 6 and the flanges 18' on the movable panels 18; so that, when said movable panels are closed as shown in Fig. V; there are interstices, extending vertically at their hinged edges, through which air can circulate, but through which rain is outwardly deflected by the baffle flanges 8". As shown in Fig. V; said hinge leaves 21 are arcuately curved in concentric relation with the axes of said pintles 20' and the outer free ends thereof, which project through slots in said panel flanges 8, are rigidly respectively connected with the adjoining edges of said panels 18. Such connection is conveniently effected by extending the free ends of said hinge leaves 21 through vertical slots in said movable panel flanges 18' and into vertical slots in the metal blocks 23 which fit into the recesses formed between said panels 18 and their flanges 18'. As shown in Fig. VI; said blocks 23 are rigidly connected with said flanges 18' by two screws 23' respectively near the upper and lower ends of said blocks, and said movable hinge leaves 21 are rigidly connected with the respective blocks 23 by pairs of screws 21', as shown in that figure.

Therefore, as may be observed with reference to the upper portion of Fig. V; all of the parts which form the hinged connections of one vertical edge of each of said movable panels 18 with the stationary housing panel 6 are entirely concealed within said housing. The opposite, free vertical edges of said movable panels 18 are provided with respective manually operative vertical slide bolting means shown at the lower part of Fig. V. Said bolting means are only accessible through the small hand opening 7$^d$ in the stationary panel 7, shown in Figs. II and III, which is normally closed by the door 24 and secured in closed position by locking means indicated at 25.

Referring to Figs. V and VIII; each of the two standards 2 at the lower portion of Fig. V has, intermediate of the height thereof, a bracket 26 which, as indicated in Fig. VIII, is rigidly connected with its standard 2 by a U-bolt 27 secured by nuts 27'. Each of said brackets 26 has at its upper end a bolt 28 extending horizontally therethrough and secured by a nut 28', as indicated in Fig. VIII. Oppositely counterpart hand levers 29 are respectively fulcrumed upon said bolts 28. The outer free ends of said levers 29 have cylindriform lugs 29' which, as best shown in Fig. VIII, extend between vertically opposite angle plates 30 which are each connected by two rivets 30' with a vertical slide bolt 31, of which there are two respectively local to the two columns 2 at the lower end of Fig. V.

Each of said slide bolts 31 is mounted to reciprocate vertically in four channel brackets 32 of which one is shown in Fig. VIII. Each of said brackets 32 has a cotter pin 33 extending horizontally therethrough, as indicated in Figs. V and VIII, holding the bolt 31 in its proper position in the channel bracket 32. Each of said brackets 32 is rigidly connected, by two rivets 32' with the adjoining flange 9 of the stationary panel 7 and the outer heads of said rivets 32' extend between said flanges 9 on the stationary panel 7 and the respective flanges 18'' on the respective movable panels 18, as shown in Fig. V; so that, when said movable panels 18 are closed as shown in Fig. V; there are interstices, extending vertically at their free edges, through which air can circulate, but through which rain is outwardly deflected by the baffle flange 9''. Respectively local to each of its four supporting brackets 32, each slide bolt 31 has a hook shaped lug 31', one of which is shown in dotted lines in Fig. VI. Each of said hook shaped lugs projects through a slot in its bracket 32 slightly longer than the lug; vertical limits of one of said slots being indicated at 32'' in Fig. VIII. Slots of greater extent than slots 32'' in the respective brackets 32 are made in registry therewith through the flanges 9 on the stationary panel 7 and through the flanges 18'' on the movable panels 18; so that when the slide bolts 31 are raised to the upper limit of their vertical movement by depressing the hand levers 29, the lugs 31' on said slide bolts register with the slots in said flanges 18'' so that the movable panels may be shut and thereupon bolted by raising the hand levers 29 to the position shown in Fig. VIII, thus sliding the bolts 31 downward to engage the hook lugs 31' on the outer side of the flanges 18'' of the respective movable panels 18.

As above noted; said hand levers 29 are only accessible for manipulation to effect the bolting and unbolting operation above described when said hand levers 29 are rendered accessible to the operator by opening the small normally locked door 24 in the stationary panel 7. Consequently, all of the fastening means above described, by which the housing members are held together are entirely secluded and concealed within the housing.

Referring to Figs. III and IV; the conduit 35 extends from a subjacent gasolene supply tank to the pump 36 which is supported by the bracket 37 bolted to said base plate 1 and by the bracket 38 rigidly connected with two of said standards 2 by clamps 40. The liquid conduit 41 extends from said pump 36 to the liquid meter 42, as shown in Fig. IV. As shown in Fig. III, the liquid conduit 43 extends from said meter 42 to the discharge conduit 44 which is rigidly connected with said top frame member 4 and provided with the hose elbow 45, as indicated in Fig. III. Said discharge conduit 44 is provided with what is known as a "see-gage" 46, which includes two transparent end caps 46', respectively at opposite sides of the casing, rendering visible the passage of liquid through said conduit 44.

Referring to Figs. I, II, XI, and XII; said hose elbow 45 extends through the stationary panel 7 and has the collar 45' bearing against the curved outer surface of said panel 7. The flexible liquid dispensing hose 47 is detachably connected with said elbow 45, at one end, by the metal coupling 47'. The other, free, end of said hose is provided with the metal nozzle 48, containing the valve 49 which is normally closed by a spring in the nozzle but may be manually opened by the valve lever 50 fulcrumed at 50' in the nozzle handle frame 48'. The lower end of said nozzle frame 48' is slotted to receive the upturned end of the stationary supporting hook 51, which then, in the position shown in Fig. I, prevents valve opening movement of said valve lever 50. Said hook 51 has the hole 51' extending through it to be engaged by a padlock, not shown, to hold the nozzle in the idle position, shown in Figs. I and II, when desired. In that position the end of said nozzle 48 extends in the stationary metal nozzle boot 53 which projects into the housing from the stationary panel 7 to which it is rigidly connected, as shown in Figs. II, XIII and XIV.

Said bracket 38 supports the eliminator casing 55, containing means for eliminating from the gasolene any entrained air or vapor which is discharged to the atmosphere outside the housing, conveniently through the conduit 56 and the nozzle boot 53, shown in Figs. XIII and XIV. The electric motor 57 is rigidly connected with the side of said eliminator casing 55, as shown in Figs. III and IV, and its armature shaft 57' drives the pulley 58 which is connected by the belt 59 with the pulley 60 on the pump shaft 61, which drives a liquid propelling rotor in said pump 36.

Said meter 42 is rigidly connected with the intermediate cross frame 62 which is rigidly connected with the standards 2 by clamps 63. The casing of said meter 42 incloses a rotor which is turned by the passage of liquid through said casing and has the driving shaft 64 which is operatively connected with the shaft 65 of the computing registering mechanism inclosed in the casing 66. Said registering mechanism includes two oppositely counterpart sets of indicating means displayed through respective windows 67 in said movable panels 18 and through which said see-gage 46 is visible.

One set of said indicating means is shown in Fig. I, where it displays at the opening 68 the price per gallon of the liquid dispensed; the price displayed being 20 1/10 cents. The opening 69 displays the number of gallons dispensed at a single operation, but, as Fig. I shows the idle condition of the apparatus preceding a dispensing operation, the opening 69 only displays three zeros. The opening 70 displays the computed value of the volume of liquid sold at a single dispensing operation, in dollars and cents, but, in the idle position of the apparatus shown, said opening displays three zeros.

The margin of each of the window openings 67 is turned inwardly, in the shape shown in Figs. IV and VII, to form a plane flange 72 to support a removable sash closure for the window. Each closure includes a glass panel 73 having, at its edges, resilient gasket frame strips 73' which are clamped upon its flange 72 by a pressed sheet metal frame 74, held by a series of screws 75 which are in threaded engagement with metal strips 75' bearing upon the outwardly turned edges of its frame 74 and the outer surface of its marginal flange 72, as shown in Fig. VII.

We find it convenient to provide the upper end of each of said panels 18 with a window 77, one of which is shown in Fig. I and both of which are shown in Fig. IV. Each of said windows 77 is provided with a closure including a glass panel 78 with framing such as above described with reference to the window 67. We also find it convenient to provide the upper inwardly recessed end of each of the stationary panels 6 and 7 with a window 80, one of which is shown in Fig. II and both of which are shown in Fig. III. Each of said windows 80 is provided with a closure including a glass panel 81 with framing such as above described with reference to the window 67.

Said windows 77 and 80 permit the transmission of light from the incandescent electric bulb 82 shown in Fig. III.

Referring to Figs. I and III; said hose supporting hook 51, which is rigidly connected with said stationary panel 7, supports the fulcrum 84 of the push switch lever 85, and the fulcrum 86 of the switch actuating lever 87. The upper end of said lever 87 is connected to the push plunger 88 and the lower end of said lever 87 is pivotally connected to the push plunger 89; both of which plungers are mounted to reciprocate horizontally through said panel 7. Said lever 87 has the arm 90 pivotally connected to the upper end of the switch rod 92, the lower end of which is pivotally connected with the electric switch 93. In the position shown in Figs. I and III; with the upper end of the push switch lever 85 thrust inward against the face of the stationary panel 7; said rod 92 is thrust to the limit of its downward movement to open said switch 93 and thus prevent operation of the electric motor 57 and pump 36. However, when said hose nozzle 48 is removed from said hook 51; said switch push lever 85 may be manually pushed inward at its lower end to reverse the position of said switch actuating lever 87, thus pulling the switch rod 92 to the upper limit of its movement and closing said switch 93 to energize said electric motor 57 and operate said pump 36.

Electrical energy is supplied within said housing, through the junction box 95, by two pairs of supply conductors indicated in Fig. IV. The pair 96 lead to said motor 36, through said switch 93, and the pair 97 lead to the lamp 82, in the upper part of the housing. Said lamp 82 not only illuminates both of the see-gage caps 46', at the opposite windows 67, and the windows 77 and 80, but also said globe 13.

However, our improved housing may be supplied with any desired electrical energy by any suitable means.

The form of bolting mechanism shown in Fig. V may be positively manually operated, both to lock and release each movable panel 18 separately. However, we prefer to provide each of the hand levers 29 with a spring 29ᵃ as shown in Fig. IV so that it is only necessary to manipulate said levers to unlock said panels; said springs being automatically operative to lock said panels when said levers are released.

In the form of our invention shown in Fig. V; each of the movable panels 18 is hingedly connected with the stationary panel 6 and detachably connected at its opposite vertical edge with the stationary panel 7 by the bolting mechanism shown in said figure, as above described. However, we find it convenient to render each of the panels bodily removable from the rest of the housing, by omitting the hinge connections thereof with the stationary panel 6, and have shown that modified form of our invention in Fig. IX.

In Fig. IX; each pair of tubular standards 2 at opposite edges of each movable panel 18 supports bolting mechanism which may be manually operated to independently or simultaneously bolt or release the opposite vertical edges of the panel 18 local thereto. In Fig. IX; each tubular standard 2 has rigidly connected therewith a bracket 26 such as shown in Fig. V but, instead of supporting respective fulcrum bolts 28 as in Fig. V, each pair of brackets 26 has journaled therein the opposite cylindrical ends of a square shaft 99. Each of said shafts 99, respectively local to the opposite panels 18, has at the end thereof adjoining the stationary panel 7 a bolt operating hand lever 100, loosely journaled on the cylindrical end portion of said shaft 99. Said hand lever 100 has a cylindriform end 100' with its axis parallel with the axis of said shaft 99 and extending between vertically opposite angle plates 30, rigidly connected with a vertical slide bolt 31, as in the form of our invention shown in Fig. V. By manually tilting said hand lever 100, without turning said shaft 99, the slide bolt 31 adjoining said stationary panel 7 may be raised and lowered to release and lock the adjoining edges of said panels 7 and 18. Said shaft 99 has rigidly connected with its square portion adjoining said hand lever 100 a hand lever 101, by which said shaft 99 may be oscillated, independently of said hand lever 100. The left hand end of the square portion of said shaft 99 has rigidly connected therewith the slide bolt operating lever 102 having the cylindrical portion 102' with its axis extending parallel with the axis of said shaft 99 between vertically opposite angle plates 30 which are rigidly connected with a vertical slide bolt 31 so that, by tilting said hand levers 101 the vertical slide bolts 31 adjoining said panel 6 may be raised and lowered to release and lock the adjoining edges of the panels 6 and 18. Therefore, when the hand levers 100 and 101 are both manually depressed to uplift the respective slide bolts 31 at the right and left hand sides of Fig. IX, the local panel 18 is entirely released from the housing and may be bodily removed.

As indicated at the right hand side of Fig. III, the door 24 in the panel 7, through which access to the bolting mechanism may be had by the operator, has its upper end connected with said panel 7 by hinges of the arcuate character such as the hinges 21 shown in Fig. V, connecting the panel 6 with the adjacent vertical edges of the panels 18, and the pintles of the hinges on said door 24 carry helical springs continually stressing said door toward its closed position. However, said door 24 may be otherwise connected with said panel 7.

Referring to Figs. I, XV, XVI, and XVII; the housing above described has, behind each of the front and back windows 67 in the movable panels 18, and supported in rigid relation with the stationary panels 6 and 7, oppositely counterpart dials 103 each having openings 68, 69, and 70, for display of the indicating means as above described, and also an elliptical opening 46" for display of the respective transparent see-gage caps 46'. Each of said dials is conveniently formed of a thin plane sheet of aluminum. In order to properly support said dials, we provide each of them with a reinforcing plate 104 formed of much heavier ferric sheet metal, having tabs 104' and 104" punched in unitary relation therewith and projecting from the outer face of each of said plates 104 to respectively abut the side and bottom edges of said dials 103; so that each dial may be readily inserted in proper relation with its reinforcing plate from the top of the latter. Each of said reinforcing plates 104 has, rigidly connected with its opposite edges, angular finishing strips 105, and a similar single finishing strip 106 is rigidly connected with the lower edge of each of said plates 104. Said strips retain the dials in proper position. Such rigid connection is conveniently effected by screws extending in holes 105' and 106' respectively at the side edges and bottom edge of each reinforcing plate 104. The inner surface of each of said finishing strips 105 and 106 is preferably chromium plated and highly polished to reflect, upon the indicating means aforesaid, light from said lamp 82.

Each of said reinforcing plates 104 has pressed therefrom and extending inwardly three tabs 107, which are perforated to receive screws by which said reinforcing plate is rigidly connected with the stationary structural elements inclosed in the housing and including said vertical tubular standards 2.

The crank handle 108, shown projecting from the housing panel 6 at the left hand side of Figs. I and III, is on a shaft 109 of said indicating mechanism which is inclosed in the housing as shown in Fig. III, and said crank may be turned by the operator to reset said mechanism to zero position. Such mechanism is not herein claimed.

We do not desire to limit ourselves to the precise details of construction or arrangement or method of operation herein set forth, as it is obvious that various modifications may be made therein without departing from the essential features of our invention, as defined in the appended claims.

We claim:

1. In a housing for liquid dispensing apparatus; the combination with a base plate having four corners; of two opposite stationary side panels of sheet metal; means, entirely concealed within said housing, respectively rigidly connecting the lower ends of said panels with said base plate, between opposite pairs of corners of said plate; a top dome plate formed of pressed sheet metal, having a knock-out portion at its central region; means, entirely concealed within said housing, rigidly connecting said dome plate with the upper ends of said panels; two movable panels, respectively at the opposite sides of said housing between said stationary panels; hinge means, entirely concealed within said housing, respectively connecting one edge of each of said movable panels with one edge of one of said stationary panels; locking means, entirely concealed within said housing, for normally detaining the free edges of said movable panels in stationary relation with said stationary panels; a door in one of said stationary panels which, when open, affords access to said locking means for said movable panels; and locking means for said door.

2. In a housing for liquid dispensing apparatus; the combination with a base plate having four corners; of two opposite stationary side panels of sheet metal; means, entirely concealed within said housing, respectively rigidly connecting the lower ends of said panels with said base plate, between opposite pairs of corners of said plate; a top dome plate; means, entirely concealed within said housing, rigidly connecting said dome plate with the upper ends of said panels; two movable panels, respectively at the opposite sides of said housing between said stationary panels, and having lock keeper means; hinge means, entirely concealed within said housing, respectively connecting one edge of each of said movable panels with one edge of one of said stationary panels; locking means, entirely concealed within said housing, and including two vertically reciprocatory slide bars, for engaging said keeper means and respectively normally detaining the free edges of said movable panels in stationary relation with said stationary panels; a door in one of said stationary panels which, when open, affords access to said locking means for said movable panels; and locking means for said door.

3. In a housing for liquid dispensing apparatus; the combination with a base plate having four corners; of two opposite stationary side panels of sheet metal; means, entirely concealed within said housing, respectively rigidly connecting the lower ends of said panels with said base plate, between opposite pairs of corners of said plate; a top dome plate formed of pressed sheet metal; means, entirely concealed within said housing, rigidly connecting said dome plate with the upper ends of said panels; two movable panels, respectively at the opposite sides of said housing between said stationary panels; hinge means, entirely concealed within said housing, respectively connecting one edge of each of said movable panels with one edge of one of said stationary panels; locking means, entirely concealed within said housing, for normally detaining the free edges of said movable panels in stationary relation with said stationary panels; a door in one of said stationary panels which, when open, affords access to said locking means for said movable panels; locking means for said door; frame means, within said housing, between said stationary panels, for bracing them against external stress, rigidly connected with said base plate, and with an upper region of said panels, including a plurality of vertical standards, and transversely extending means connecting them at an upper region.

4. In a housing for liquid dispensing apparatus; the combination with a base plate having four corners; of two opposite stationary side panels of sheet metal; means, entirely concealed within said housing, respectively rigidly connecting the lower ends of said panels with said base plate, between opposite pairs of corners of said plate; a top dome plate formed of pressed sheet metal; means, entirely concealed within said housing, rigidly connecting said dome plate with the upper ends of said panels; two movable panels, respectively at the opposite sides of said housing between said stationary panels; hinge means, entirely concealed within said housing, respectively connecting one edge of each of said movable panels with one edge of one of said stationary panels; locking means, entirely concealed within said housing, for normally detaining the free edges of said movable panels in stationary relation with said stationary panels; a door in one of said stationary panels which, when open, affords access to said locking means for said movable panels; locking means for said door; a window in one of said movable panels; a closure for said window, including a pressed sheet metal reinforcing plate having tabs cut therefrom and in offset relation with its plane; and means rigidly connecting said closure with said panel, in registry with said window.

5. In a housing for liquid dispensing apparatus; the combination with a base plate having four corners; of two opposite stationary side panels of sheet metal; means, entirely concealed within said housing, respectively rigidly connecting the lower ends of said panels with said base plate between opposite pairs of corners of said plate, with the lower ends of said panels spaced above said base plate to afford interstices between said plate and panels for admission of air and exit of water; and an air vent at the upper portion of said housing; whereby air is circulated upwardly through said housing to eliminate any explosive vapors therefrom and moisture condensed within said housing is drained out at the lower ends of said panels, over said base plate; a movable panel, between said stationary panels; means, entirely concealed within said housing, respectively rigidly connecting the opposite vertical edges of said movable panel with the adjoining vertical edges of said stationary panels in such spaced relation as to form interstices between said movable and stationary panels for the passage of air; and baffle means, within said housing, at the interstices between said vertical edges of the panels preventing ingress of rain to said housing.

6. In a housing for liquid dispensing apparatus; the combination with a base plate having four corners; of two opposite stationary side panels of sheet metal; means, entirely concealed within said housing, respectively rigidly connecting the lower ends of said panels with said base plate between opposite pairs of corners of said plate, with the lower ends of said panels spaced above said base plate to afford interstices between said plate and panels for admission of air and exit of water; and an air vent at the upper portion of said housing; whereby air is circulated upwardly through said housing to eliminate any explosive vapors therefrom and moisture condensed within said housing is drained out at the lower ends of said panels, over said base plate; a movable panel, between said stationary panels; means, entirely concealed within said housing, respectively rigidly connecting the opposite vertical edges of said movable panel with the adjoining vertical edges of said stationary panels in such spaced relation as to form interstices between said movable and stationary panels for the passage of air; and baffle means, within said housing, at the interstices between said vertical edges of the panels preventing ingress of rain to said housing; and baffle means within said housing, at said air vent, preventing ingress of rain to said housing.

7. In a housing for liquid dispensing apparatus; the combination with a base plate having four corners; of two opposite stationary side panels of sheet metal; means, entirely concealed within said housing, respectively rigidly connecting the lower ends of said panels with said base plate, between opposite pairs of corners of said plate, with the lower ends of said panels spaced above said base plate to afford interstices between said plate and panels for admission of air and exit of water; a top dome plate, means, entirely concealed within said housing, rigidly connecting said dome plate with the upper ends of said panels; two movable panels, respectively at the opposite sides of said housing between said stationary panels; means, entirely concealed within said housing, for normally securing the opposite vertical edges of said movable panels in stationary relation with the adjoining vertical edges of said stationary panels, in spaced relation to afford interstices between said stationary and movable panels at their adjoining vertical edges for passage of air; and baffle means, entirely concealed within said housing, at said interstices, for preventing ingress of rain to said housing; whereby air is circulated upwardly through said housing to eliminate any explosive vapors therefrom and moisture condensed within said housing is drained out at the lower ends of said panels, over said base plate.

ERIC H. BRADLEY.
WILLIAM H. D. BROUSE.